United States Patent
Shah et al.

(10) Patent No.: US 7,996,361 B1
(45) Date of Patent: Aug. 9, 2011

(54) METHOD AND SYSTEM OF PROVIDING REPLICA FILES WITHIN A FILESET

(75) Inventors: Aalop S. Shah, Pune (IN); Milind Borate, Pune (IN); Basant Rajan, Pune (IN)

(73) Assignee: Symantec Operating Corporation, Mountain View, CA (US)

(*) Notice: Subject to any disclaimer, the term of this patent is extended or adjusted under 35 U.S.C. 154(b) by 621 days.

(21) Appl. No.: 10/610,119

(22) Filed: Jun. 30, 2003

(51) Int. Cl.
*G06F 7/00* (2006.01)
*G06F 17/00* (2006.01)

(52) U.S. Cl. ......... 707/626; 707/634; 707/638; 711/162

(58) Field of Classification Search ............... 707/1–10, 707/100–104.1, 200–205; 711/147; 345/629; 717/156, 157
See application file for complete search history.

(56) References Cited

U.S. PATENT DOCUMENTS

| | | | | |
|---|---|---|---|---|
| 4,571,678 A * | 2/1986 | Chaitin | ......... | 717/156 |
| 5,249,295 A * | 9/1993 | Briggs et al. | ......... | 717/157 |
| 5,418,958 A * | 5/1995 | Goebel | ......... | 717/156 |
| 5,761,678 A * | 6/1998 | Bendert et al. | ......... | 707/204 |
| 5,774,730 A * | 6/1998 | Aizikowitz et al. | ......... | 717/157 |
| 5,909,540 A * | 6/1999 | Carter et al. | ......... | 714/4 |
| 5,918,229 A * | 6/1999 | Davis et al. | ......... | 707/10 |
| 5,966,143 A * | 10/1999 | Breternitz, Jr. | ......... | 345/629 |
| 6,073,128 A * | 6/2000 | Pongracz et al. | ......... | 707/3 |
| 6,148,377 A * | 11/2000 | Carter et al. | ......... | 711/147 |
| 6,418,447 B1 * | 7/2002 | Frey et al. | ......... | 707/103 R |
| 6,446,175 B1 * | 9/2002 | West et al. | ......... | 711/162 |
| 6,516,327 B1 * | 2/2003 | Zondervan et al. | ......... | 707/200 |
| 6,523,036 B1 * | 2/2003 | Hickman et al. | ......... | 707/10 |
| 6,618,737 B2 * | 9/2003 | Aridor et al. | ......... | 707/205 |
| 6,721,764 B2 * | 4/2004 | Hitz et al. | ......... | 707/202 |
| 6,772,302 B1 * | 8/2004 | Thompson | ......... | 711/162 |
| 6,996,682 B1 * | 2/2006 | Milligan et al. | ......... | 711/141 |
| 7,039,663 B1 * | 5/2006 | Federwisch et al. | ......... | 1/1 |
| 7,043,485 B2 * | 5/2006 | Manley et al. | ......... | 707/100 |
| 7,398,285 B2 * | 7/2008 | Kisley | ......... | 1/1 |
| 2002/0174103 A1 * | 11/2002 | Hsiao et al. | ......... | 707/1 |
| 2003/0115218 A1 * | 6/2003 | Bobbitt et al. | ......... | 707/200 |
| 2003/0131025 A1 * | 7/2003 | Zondervan et al. | ......... | 707/200 |
| 2003/0182313 A1 * | 9/2003 | Federwisch et al. | ......... | 707/200 |
| 2003/0182322 A1 * | 9/2003 | Manley et al. | ......... | 707/201 |
| 2003/0182325 A1 * | 9/2003 | Manley et al. | ......... | 707/204 |
| 2003/0195903 A1 * | 10/2003 | Manley et al. | ......... | 707/201 |
| 2004/0030951 A1 * | 2/2004 | Armangau | ......... | 714/6 |
| 2004/0078637 A1 * | 4/2004 | Fellin et al. | ......... | 714/6 |
| 2004/0193952 A1 * | 9/2004 | Narayanan et al. | ......... | 714/13 |
| 2005/0111015 A1 * | 5/2005 | Tsujimoto | ......... | 358/1.9 |

OTHER PUBLICATIONS

Bolosky, William J., Scott Corbin, David Boebel, and John R. Douceur, Single Instance Storage in Windows® 2000, *Microsoft Research. Balder Technology Group, Inc.*, 12 pages.

* cited by examiner

*Primary Examiner* — Usmaan Saeed
(74) *Attorney, Agent, or Firm* — Campbell Stephenson LLP

(57) ABSTRACT

A method and system of providing replica files within a fileset is disclosed. According to one embodiment, a method is provided which comprises associating a source file and a replica file of the source file within a fileset, wherein the replica file of the source file comprises a virtual copy of the source file. In another embodiment wherein the source file comprises a metadata file system object and the replica file of the source file comprises a replica metadata file system object, the associating comprises generating a reference within the replica metadata file system object to the metadata file system object.

19 Claims, 17 Drawing Sheets

METHOD AND SYSTEM OF PROVIDING REPLICA FILES WITHIN A FILESET

BACKGROUND

1. Technical Field

The present invention relates to data storage and retrieval generally and more particularly to a method and system of providing replica files within a fileset.

2. Description of the Related Art

Information drives business. Companies today rely to an unprecedented extent on online, frequently accessed, constantly changing data to run their businesses. Duplicate copies as well as slightly altered versions or editions of such data are commonly made and maintained, for example, to facilitate independent and simultaneous data access by a number of users and/or processes. Providing such copies or versions has until recently required data to be completely replicated for each copy or version made, often resulting in wasted storage space, particularly for infrequently-accessed and/or modified data. Alternatively, links (e.g., hard links or symbolic links) may be used to reference a single data image. Use of such links fails however to provide an exclusive copy of the data to each user or process. In other words, a change or write operation made by one user or process is immediately visible to all users or processes with an associated loss of prior or original data.

More recently, methods (e.g., storage checkpoints) have become available for providing persistent frozen or "point-in-time" images of data using copy-on-write technology. In a storage checkpoint, only that data which has been modified or written-to in a checkpointed data image following the storage checkpoint's creation is stored. In conventional data storage and/or processing systems however, such methods have been used primarily to facilitate off-host processing such as data backups and consequently, storage checkpointing or "cloning" has been typically performed on entire filesets as this is the most common level for performing backups, where a "fileset" is included in a conventional file system such as a Unix File System (UFS), NT File System (NTFS), File Allocation Table (FAT)-based file system or the like within a virtual file system (e.g., the Veritas File System provided by Veritas Software Corporation of Mountain View, Calif.) or a conventional, independent file system where no such virtual file system is present.

FIG. 1 illustrates a file system including a fileset and an associated storage checkpoint according to the prior art. File system 100 of FIG. 1 includes a primary fileset 110 and an associated storage checkpoint 120. Primary fileset 110 in turn includes namespace components (e.g., files, directories, etc.) 112, 114, and 116 and storage checkpoint 120 includes corresponding namespace components 122, 124, and 126. Although namespace components 112-116 are arranged in a hierarchical manner in the file system of FIG. 1, where namespace component 112 references namespace components 114 and 116, any number of namespace components arranged in any number of configurations could just as easily be implemented according to the prior art. In the illustrated prior art file system, namespace component 114 in turn references or is associated with data within data blocks 115A-115D and namespace component 116 references or is associated with data within data blocks 117A-117D.

In the illustrated example, storage checkpoint 120 is a so-called "virtual copy", logically identical to primary fileset 110 when storage checkpoint 120 is created, but lacks any associated allocated data blocks and initially stores no data. Instead, storage checkpoint 120 initially includes only namespace components 122-126 within a hierarchical directory structure identical to that of primary fileset 110 and associated references (e.g., pointers) to data blocks (e.g., data blocks 115 and 117) associated with the primary fileset 110. One of skill in the art will recognize that such references may be implemented as one or more arrays of pointers to individual data blocks associated with primary fileset 110 or as one or more single pointers to a list of pointers to such data blocks. Storage checkpoint 120 is typically created within the free space available to primary fileset 110, and thereby minimizes the use of storage space. The following example describes creation and use of a storage checkpoint such as storage checkpoint 120 in further detail.

FIGS. 2A-2B illustrate a write operation within a file system including a fileset and an associated storage checkpoint according to the prior art. The file system 200 illustrated in FIG. 2A includes a primary fileset 210 and a storage checkpoint 220 similar to those described with respect to FIG. 1. Primary fileset 210 includes files 212 and 214 which are associated with data blocks 213A-E and 215A-E, respectively, utilizing one or more associated metadata file system objects (e.g., file indices, i-nodes, etc.) each including one or more associated data block maps. In the exemplary file system of FIG. 2A, file 214 contains/references a replicated copy of the same data contained/referenced by file 212 such that two distinct copies of the data are maintained. Blocks such as data blocks 213 and 215 may include file data directly, or may otherwise identify or reference (e.g., using disk block numbers) the actual data blocks containing such data.

Storage checkpoint 220 of FIGS. 2a and 2b includes sparse files 222 and 224 corresponding to files 212 and 214 of primary fileset 210 each in turn comprising one or more references (e.g., pointers) to data blocks associated with the primary fileset 210 and/or allocated blocks associated with persistent storage. It should be noted that there is a one to one correspondence between files within the primary fileset and sparse files or similar namespace components within storage checkpoint 220. The blockmaps of sparse files 222 and 224 may initially include references 223A-223E and 225A-225E, as illustrated, respectively corresponding to each block (e.g., data blocks 213 and 215) of files 212 and 214. In FIG. 2B, the file system of FIG. 2A is illustrated following write operations to data blocks 213B, 213E, and 215C of primary fileset 210. In this example, prior to performing any write operation(s), data block(s) are allocated as needed within sparse files 222 and 224 to store the prior contents of data blocks 213B, 213E, and 215C of files 212 and 214.

After the prior data contents have been stored (e.g., "pushed" or "pulled") within the newly allocated data blocks 223B, 223E, and 225C of sparse files 222 and 224, new data may be written to blocks 213B, 213E, and 215C of primary fileset 210 and the write operation may be completed. This process may be continued as additional write operations are performed on files 212 and 214 until all of the original data contents of the files has been transferred such that sparse files 222 and 224 become complete and independent files themselves.

SUMMARY

Disclosed is a method and system of providing replica files within a fileset. Embodiments of the present invention may be used to reduce the replication of data and storage space requirements by extending existing storage checkpoint or "clone" facilities and associated copy-on-write techniques to individual files within a fileset.

According to one embodiment, a method is provided which comprises associating a source file and a replica file of the source file within a fileset, wherein the replica file of the source file comprises a virtual copy of the source file. In another embodiment wherein the source file comprises a metadata file system object and the replica file of the source file comprises a replica metadata file system object, the associating comprises generating a reference within the replica metadata file system object to the metadata file system object.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
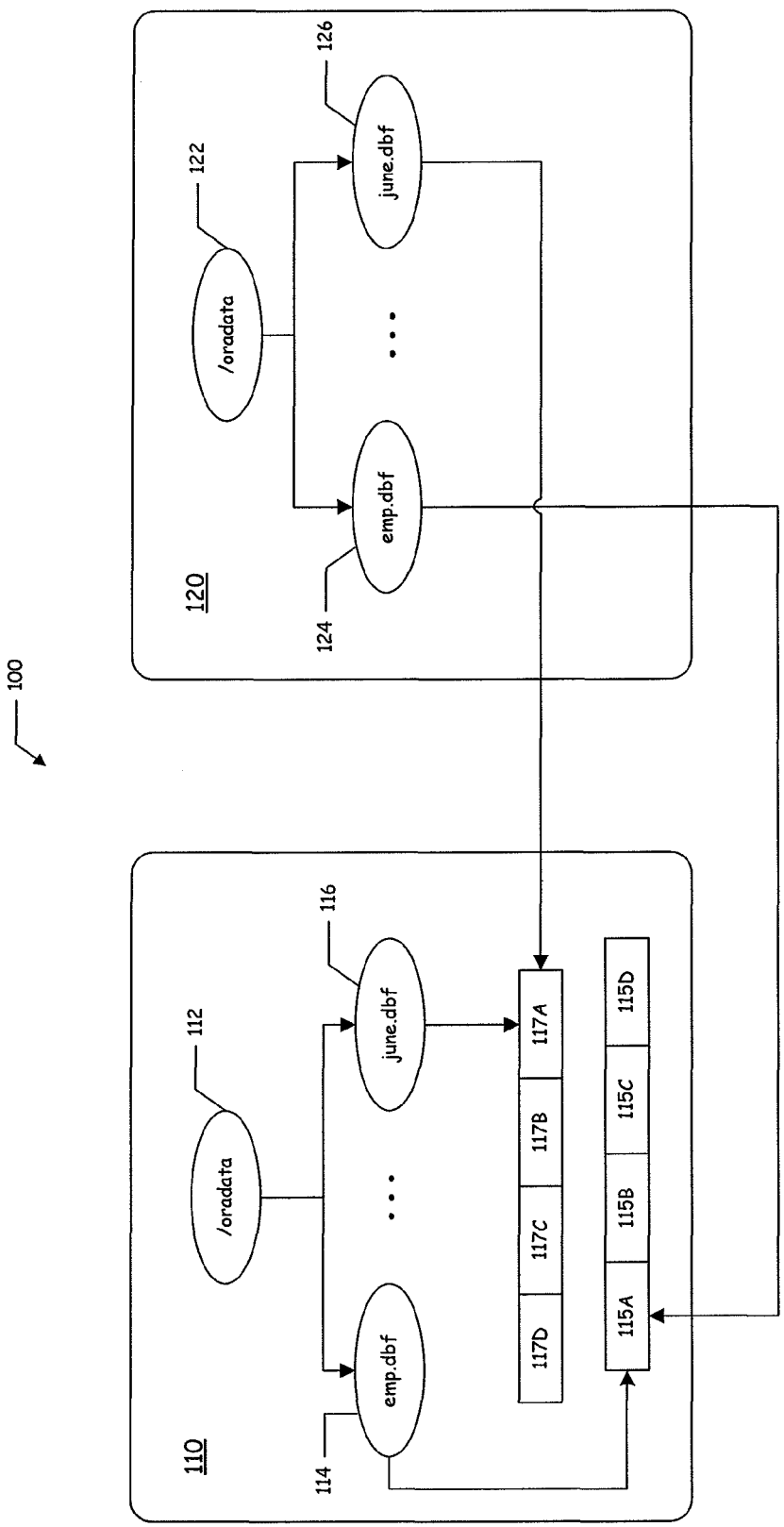
FIG. 1 illustrates a file system including a fileset and an associated storage checkpoint according to the prior art.
Figure 2A:
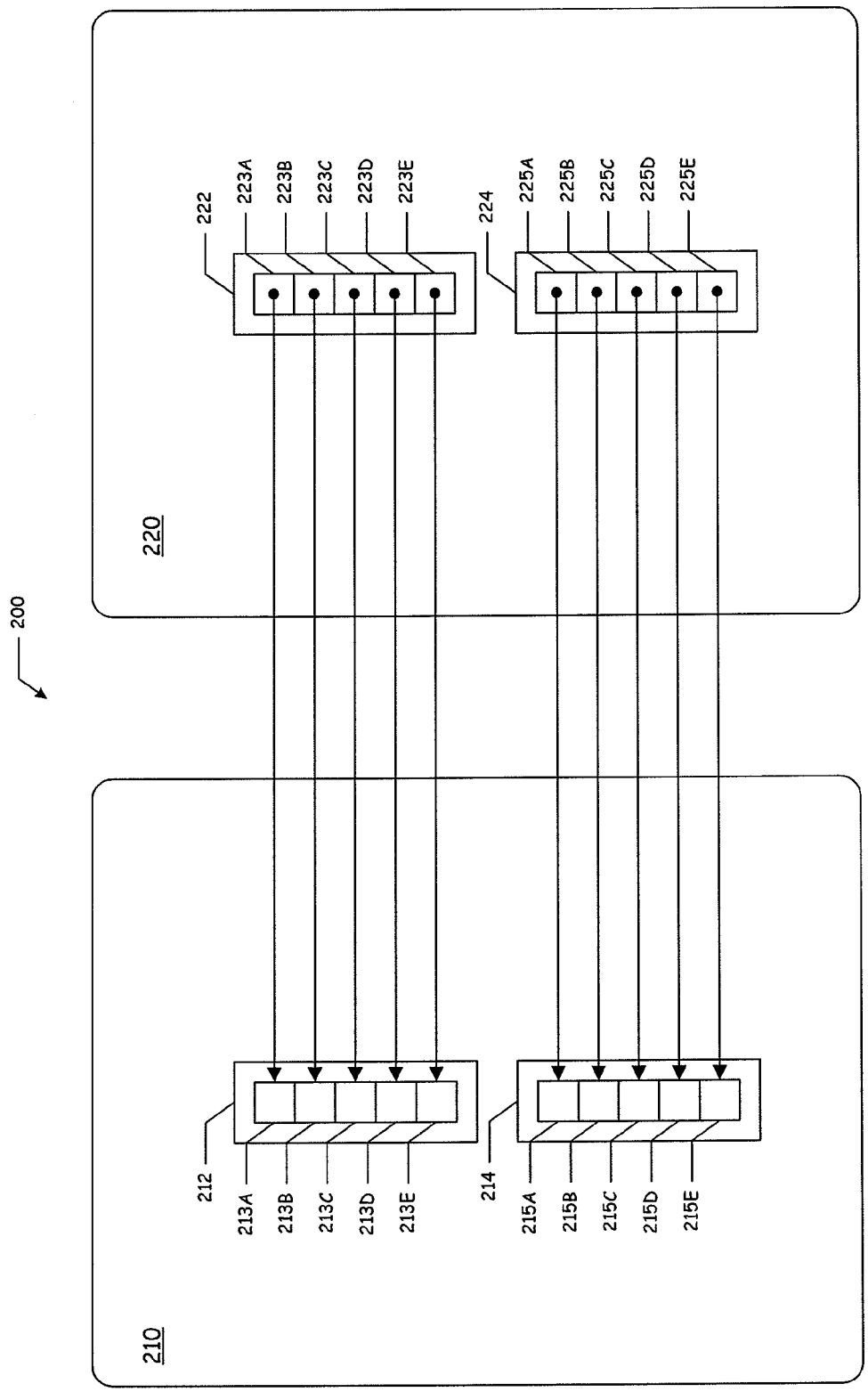
FIGS. 2A-2B illustrate a write operation within a file system including a fileset and an associated storage checkpoint according to the prior art.
Figure 2B:
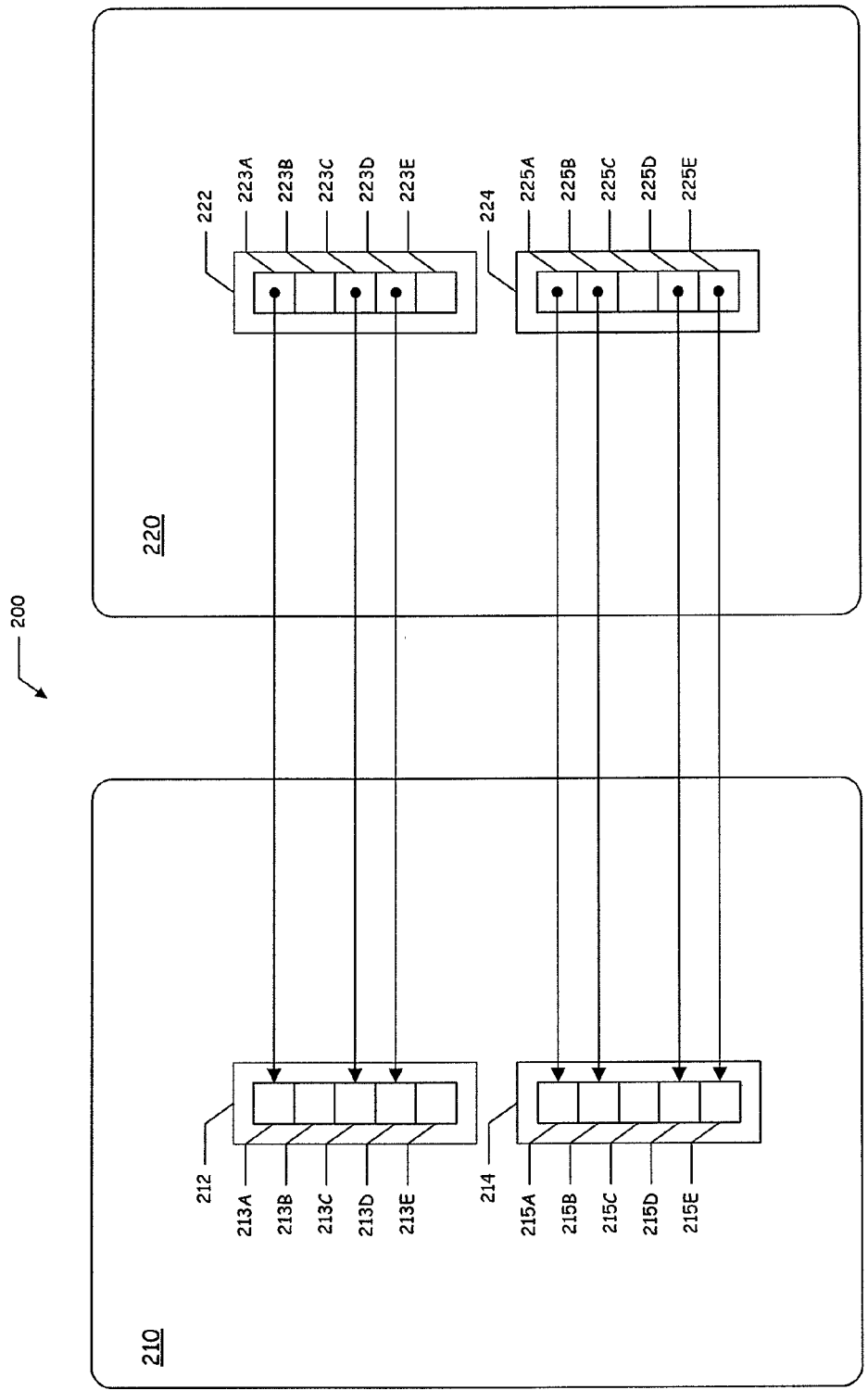
Figure 3:
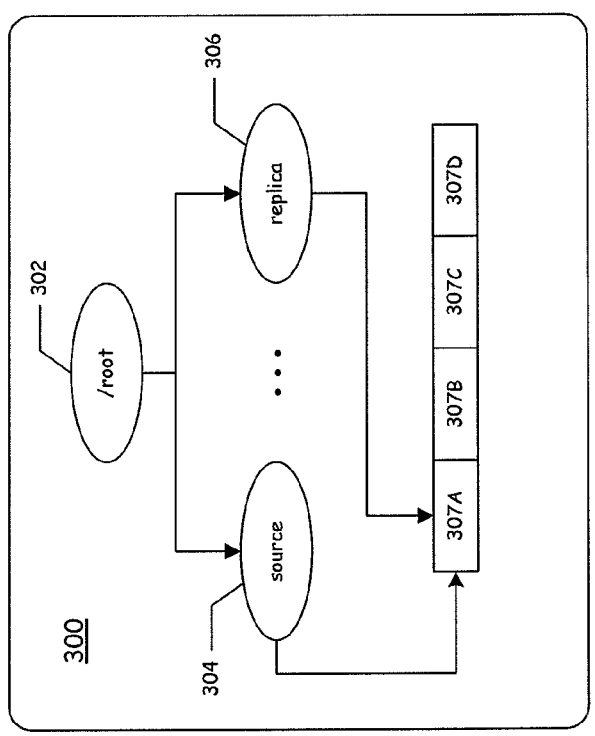
FIG. 3 illustrates a fileset including a source file and a replica file according to an embodiment of the present invention.

FIG. 3 illustrates a fileset including a source file and a replica file according to an embodiment of the present invention. Fileset 300 of the illustrated embodiment includes namespace components (e.g., files, directories, etc.) 302-306.

Although namespace components 302-306 are arranged in a hierarchical manner in the fileset of FIG. 3, where namespace component 302 (/root) references namespace components 304 (source) and 306 (replica), any number of namespace components arranged in any number of configurations are contemplated by alternative embodiments of the present invention. In the embodiment illustrated by FIG. 3, unlike in prior art file systems in which namespace components of a given fileset must each reference independent groups of data blocks, source and replica files such as namespace components 304 and 306 are provided which reference a single group of data blocks 308A-308D using copy-on-write technology. According to one embodiment of the present invention, one or more similar or duplicate file indices (e.g., i-nodes) are created within fileset 300 to provide the described file replica functionality.

In the described fileset, no additional independent data blocks must be allocated and associated with namespace component 306 until such time as data is to be modified within the source file or replica file corresponding to namespace components 304 and 306, respectively. Additionally, the amount of storage (e.g., data storage blocks) which must be allocated is reduced to more accurately reflect the number and location of the modifications which occur. While data block-level granularity has been illustrated with respect to the embodiment of FIG. 3, all granularity levels (e.g., extent-level, file-level, etc.) are contemplated in alternative embodiments of the invention and the number of storage units (e.g., blocks, extents, etc.) which are allocated or transferred in response to a request to modify data within namespace components of fileset 300 may be varied according to other embodiments of the present invention. The described file-replica functionality may also be extended in a variety of other ways. For example, a replica of another replica or multiple replicas of a single file may be generated to provide increased operational and/or storage efficiencies.

According to still more embodiments of the present invention, the described functionality may be implemented in any number of ways. For example, according to one embodiment, the described functionality is provided through a file system application programming interface (API) which intercepts or overwrites copy file system requests and commands such that a "copy" command used to copy a file within a single fileset results in a source-replica relationship being established. Alternatively, a file system kernel may be modified to detect and re-direct file copy commands in a similar manner.

In another embodiment, a daemon system process may be used, as just one example, to determine and maintain file checksums within a centralized or distributed index. The index could then be used by the daemon or another process to scan for identical copies of files within a fileset so that a source-replica relationship could be established there between. According to the described embodiment, when a new file is created, its checksum is determined and compared to that of existing files to identify potential file copies. In another embodiment, the described daemon acts as a background process or utility, checking the index for previously created file copies or files which became similar or identical by operation of writes occurring after their creation. In yet another embodiment of the present invention, a file change log (e.g., a bitmap having a bit location corresponding to each block or region within a file to indicate whether that block or region has been modified since the log was created or reset) is used to quickly determine which files have recently changed and consequently need to be scanned for potential source-replica coalescing.

Such checksums may be periodically or constantly determined or updated and then used, for example, when a file is closed to identify such file copies. In on embodiment of the present invention, an extendible hash index is used to store the described checksums. In yet another embodiment, each file or other namespace component within a file set maintains a list of its replicas and to the source from which it depends.

Figure 4A:
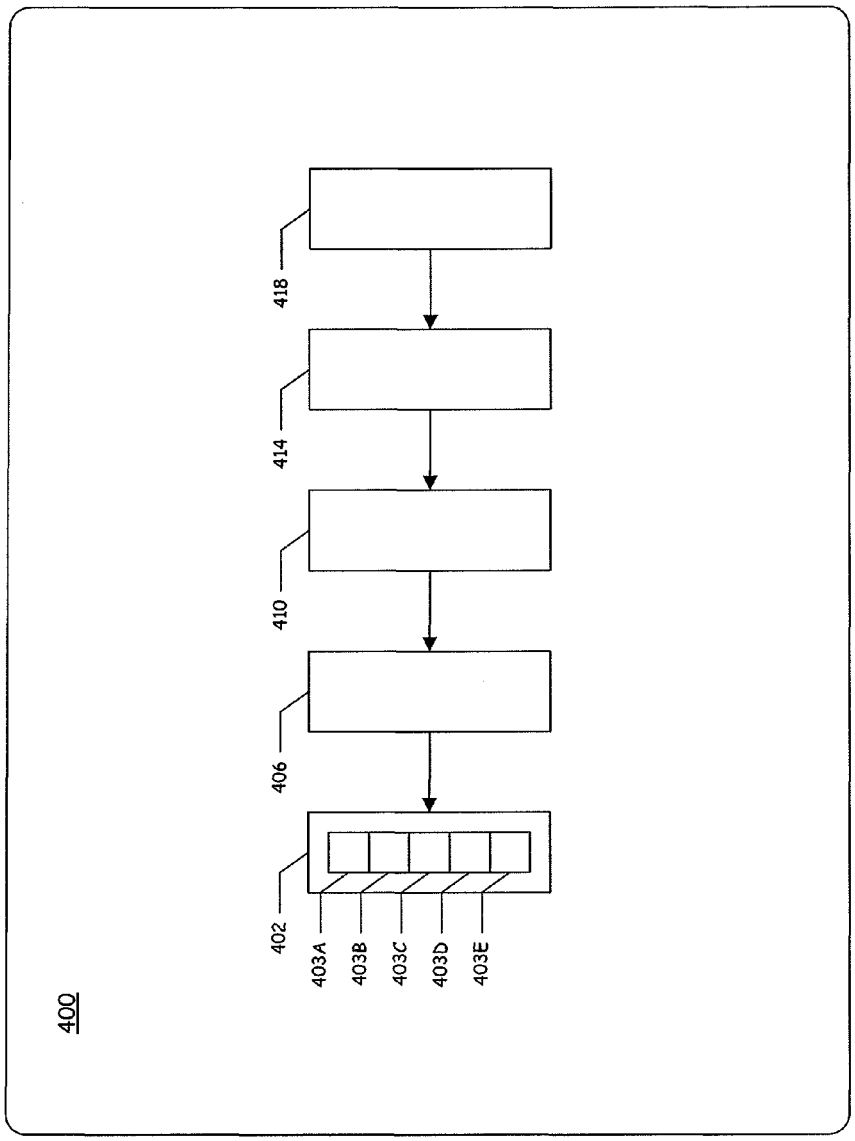
FIGS. 4a-4c illustrate a fileset including a source file and a number of replica files arranged within a chain structure according to an embodiment of the present invention.
Figure 4B:
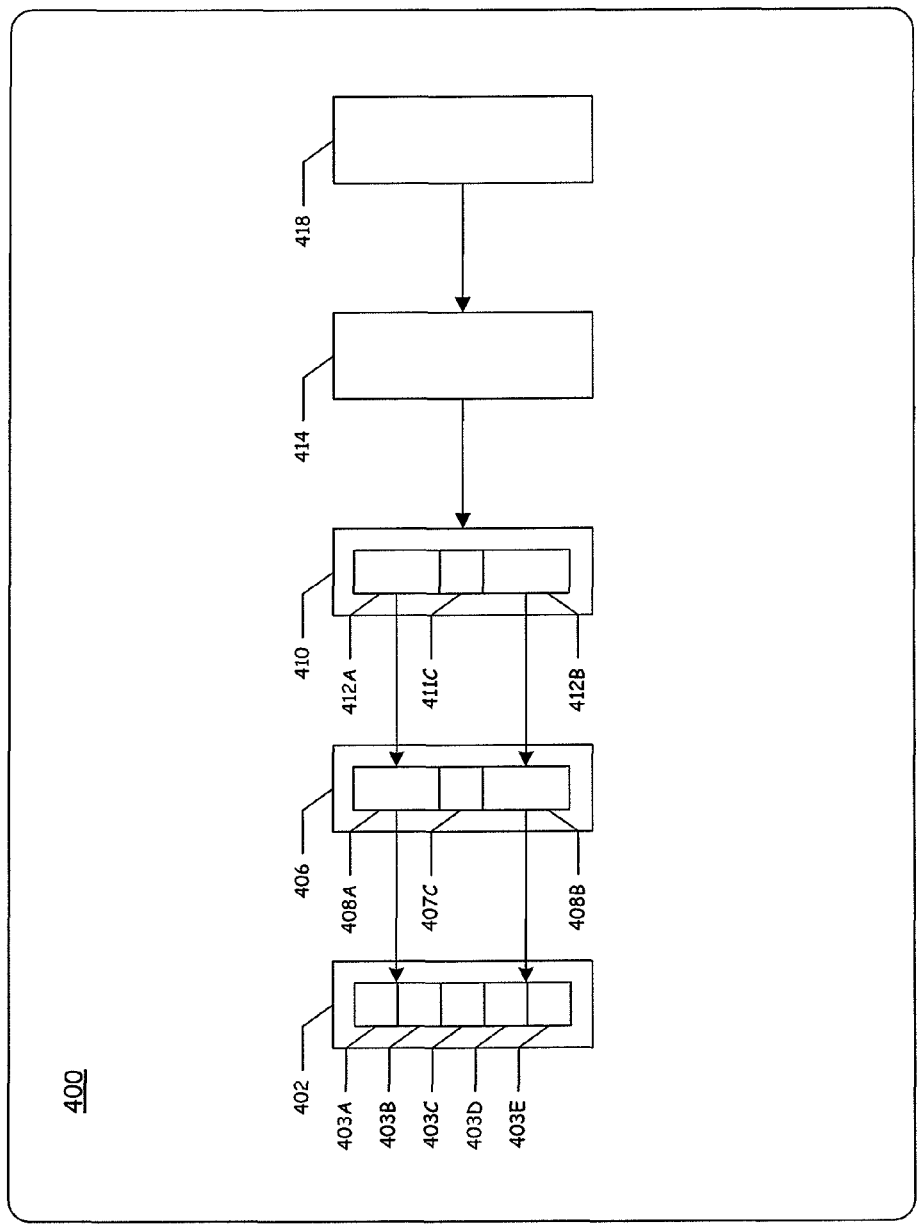
Figure 4C:
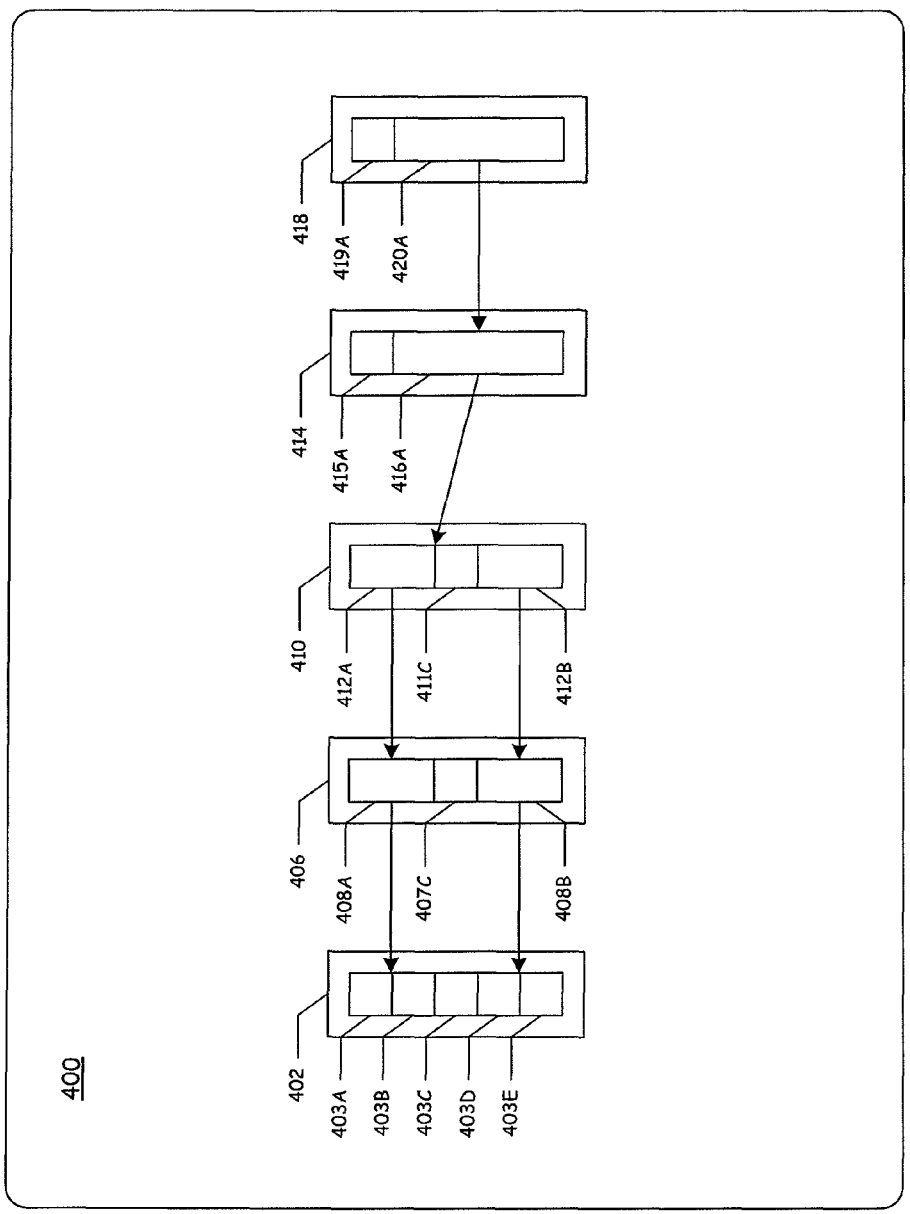

FIGS. 4a-4c illustrate a fileset including a source file and a number of replica files arranged within a chain structure according to an embodiment of the present invention. The fileset 400 of the illustrated embodiment of FIG. 4a includes a source file 402 and a number of replica files 406, 410, 414 and 418 as shown. While replica files such as replica files 406, 410, 414 and 418 of FIG. 4a may be described as copies of source file 402, the particular designation or relationship between replica files (e.g., whether replica file 410 is a copy of source file 402 or of replica file 406) should not be construed as limiting to the invention embodiments described herein.

Source file 402 of the described embodiment includes a number of associated data blocks 403a-403e which are referenced by replica files 406, 410, 414 and 418. As shown in FIG. 4a, replica files 406, 410, 414 and 418 are arranged in a chain structure and according to one embodiment, each replica file includes a file index (e.g., one or more i-nodes) with a pointer or reference to that replica file's immediate predecessor in the chain. It is to be appreciated that both the number of replica files and blocks within source file 402 depicted within FIG. 4a are completely arbitrary and could comprise any numbers in alternative embodiments of the invention. Similarly, while blocks such as blocks 403a-403e have been illustrated herein, other storage units or designators (e.g., extents) may be used interchangeably.

In the fileset embodiment illustrated by FIG. 4b, a write operation to a portion of replica file 406 has been depicted with the associated changes to the dependency chain structure shown. More specifically, a block 411c is allocated within replica file 410 and used to store data pulled from block 403c of source file 402. Consequently, extents 412a and 412b are created (e.g., replacing a single prior extent linking replica file 410 and replica file 406) to link portions of replica file 410 not associated with independent allocated blocks and therefore dependent on preceding replica file 406 with corresponding portions of that replica file. Similarly a block 407c, used to store data associated with the described write operation, and extents 408a and 408b are created or allocated within replica file 406.

In the fileset embodiment illustrated by FIG. 4c, a write operation to a portion of replica file 414 has been depicted with the associated changes to the dependency chain structure shown. More specifically, a block 419a is allocated within replica file 418 and used to store data pulled from block 403a of source file 402. Consequently, extent 420a is created to link a portion of replica file 418 which is not associated with independent allocated block 419a and therefore dependent on preceding replica file 414 with corresponding portions of that replica file. Similarly a block 415a, used to store data associated with the described write operation, and extent 416a are created or allocated within replica file 414.

Figure 5A:
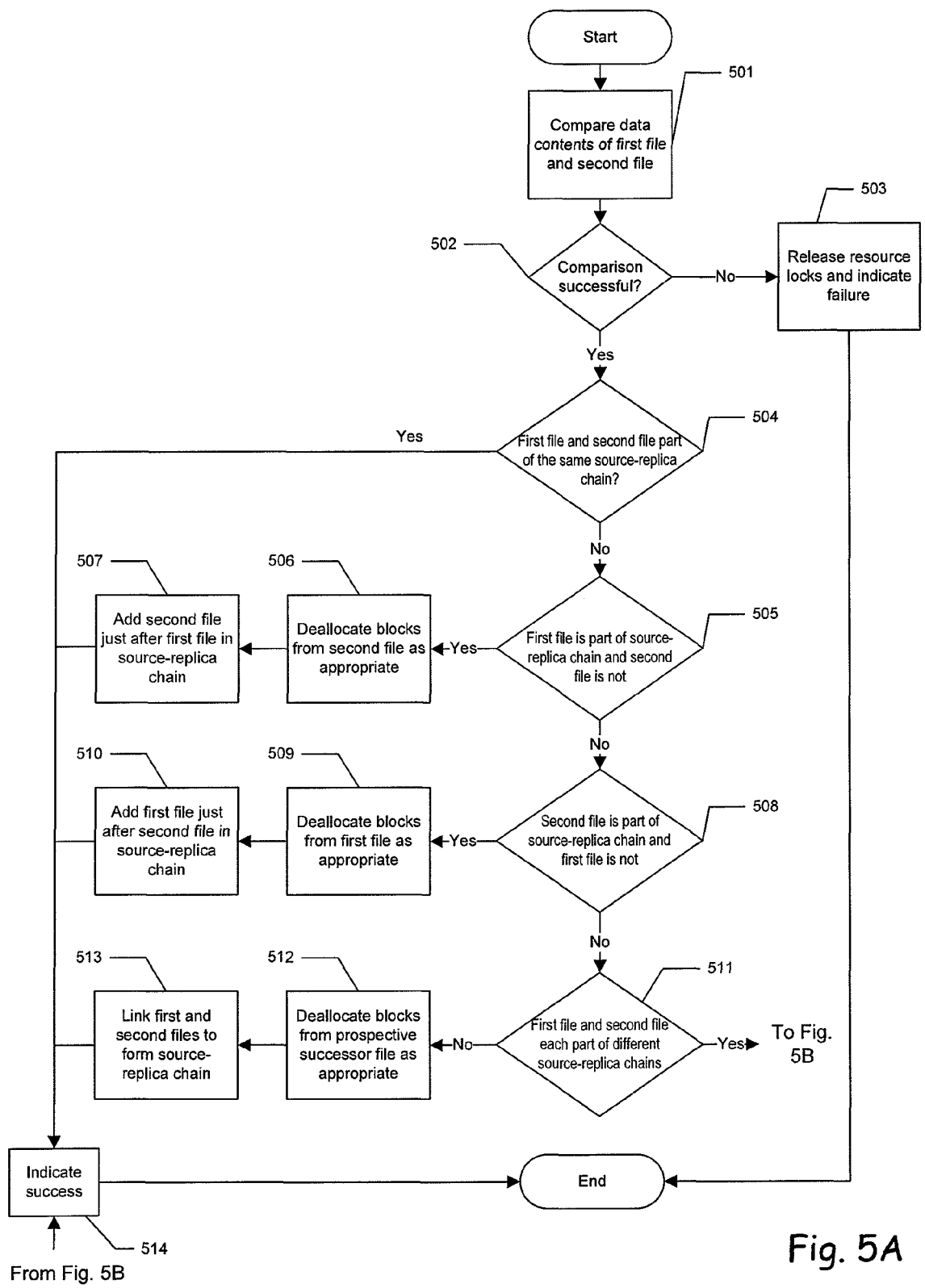
FIG. 5a illustrates a first portion of a process for forming one or more replica files of a source file using a chain structure according to an embodiment of the present invention.

FIG. 5a illustrates a first portion of a process for forming one or more replica files of a source file using a chain structure according to an embodiment of the present invention. In the illustrated process, a comparison of the data contents of a first file and a second file is first performed (process block 501) to determine whether the first and second files are, in fact, copies of one another. A determination is then made whether or not the comparison completed successfully (e.g., if the comparison was actually performed and the first file and second file were determined to be copies of one another) (process block 502). The threshold and technique for establishing that the first and second files are in fact copies may be varied using any of a number of known techniques and does not require absolute identity between the two files in all cases. According to an alternative embodiment of the present invention, a threshold of similarity between two files can be established (e.g., statically or dynamically) and used to determine for which groups of files a source-replica relationship is to be established and how such a relationship (e.g., which file is to be designated the source and which the replica) will be set up. According to yet another embodiment, individual files may be subdivided into smaller component parts (e.g., groups of blocks or extents) with source-replica relationships being established for at least a portion of the identified components. If the comparison failed to complete successfully, any resource locks associated with the files are released and a source-replica relation failure is indicated (process block 503) as shown.

If the comparison was determined to be successful however, another determination is made whether the first and second files are already actually part of the same source-replica chain (process block 504). If so, an indication is made that the source-replica relationship was successfully established (process block 514). If it is determined that the first and second files are not already actually part of the same source-replica chain, a determination is next made whether the first file is part of a source-replica chain while the second file is not (process block 505). If so, data blocks are deallocated from the second file as appropriate (process block 506) and the second file is added just after the first file in its source-replica chain (process block 507) before success of the operation is indicated (process block 514). If it is not determined that the first file is part of a source-replica chain while the second file is not, a determination is made whether the second file is part of a source-replica chain while the first file is not (process block 508). If so, data blocks are deallocated from the first file as appropriate (process block 509) and the first file is added just after the second file in its source-replica chain (process block 510) before success of the operation is indicated (process block 514).

Figure 5B:
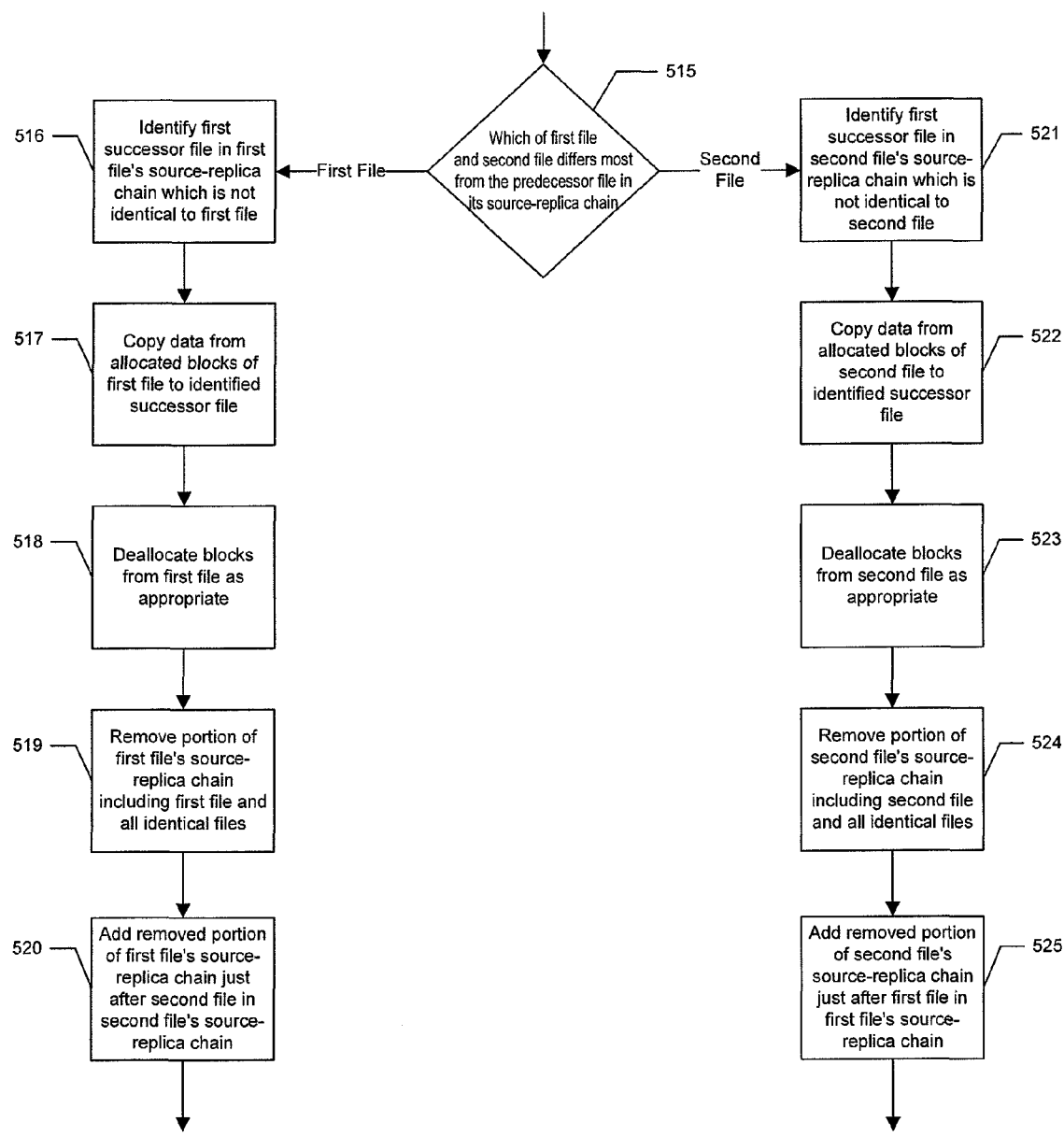
FIG. 5b illustrates a second portion of a process for forming one or more replica files of a source file using a chain structure according to an embodiment of the present invention.

Subsequently, a determination is made whether the first and second files are each part of separate source-replica chains (process block 511). If the first and second files are each part of separate source-replica chains, a sub-process illustrated by FIG. 5b is performed which returns and indicates success as shown, otherwise a prospective successor file is selected from the first file and the second file and data blocks are deallocated from the prospective successor file as appropriate (process block 512). According to one embodiment of the present invention, the selection of the prospective successor file is arbitrary or random. Thereafter the first file and the second file are appropriately linked to form a source-replica chain (process block 513) as shown (e.g., the prospective successor file is added to the other file just behind it in the source-replica chain). Success is then indicated and the illustrated process terminates as shown.

FIG. 5b illustrates a second portion of a process for forming one or more replica files of a source file using a chain structure according to an embodiment of the present invention. Entering the depicted process from the process illustrated by FIG. 5a, a determination is first made which of the first and second file differs most from the predecessor file in their respective source-replica chain (process block 515). If the first file exhibits the greatest difference, the first successor file within the first file's source-replica chain which is not identical to the first file is identified (process block 516). Next, data is copied from allocated blocks of the first file to the identified successor file (process block 517). According to one embodiment of the present invention, such data is only copied into previously unallocated blocks of the successor file. In other words, existing data within the successor file is not overwritten. Once this has been accomplished, blocks are deallocated from the first file as appropriate (process block 518).

Once the appropriate blocks, if any, have been deallocated from the first file, the portion of the first file's source-replica chain which includes the first file and all identical successor files (process block 519) is removed from the first file's replica chain. This removed portion of the first file's source-replica chain is then added to the second file's source-replica chain immediately after the second file (process block 520) as shown. In an alternative embodiment, files which are identical to the first file are disregarded and only the first file is moved to the second file's source-replica chain. While this described embodiment is simpler to implement, the resultant storage space savings are less than obtainable using the technique which is depicted in FIG. 5b and described herein. Thereafter, the process illustrated by FIG. 5a is re-entered as previously described herein. If a determination is made that the second file differs the most from its predecessor file the process elements (process blocks 516-520) as previously described with respect to the first file are performed substituting the first and second files.

Figure 5C:
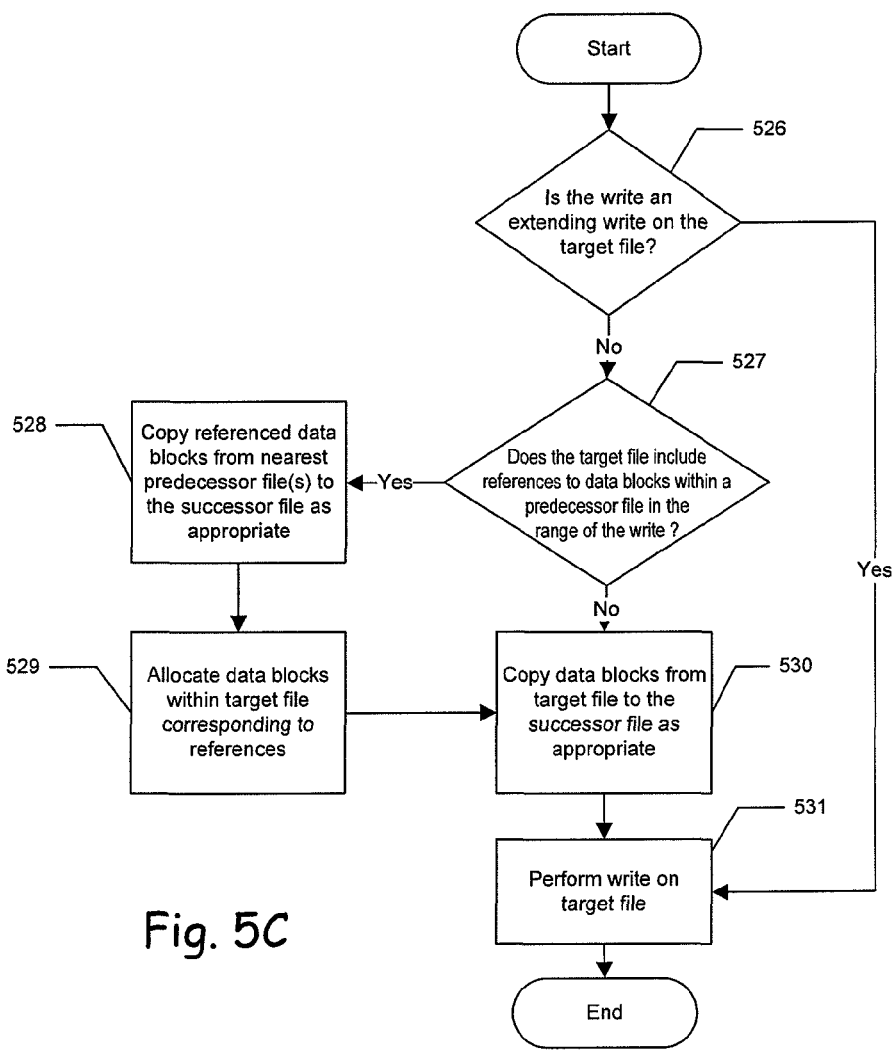
FIG. 5c illustrates a process for maintaining data coherency within a fileset including a source file and a number of replica files formed using a chain structure according to an embodiment of the present invention.

FIG. 5c illustrates a process for maintaining data coherency within a fileset including a source file and a number of replica files formed using a chain structure according to an embodiment of the present invention. In the illustrated process, a determination is first made whether a requested write operation is an "extending" write (process block 526). According to one embodiment, an extending write is a write beginning at the boundary of a file which consequently adds to or "grows" a file. If the requested write is an extending write, no changes are required to the source-replica relationship or any files of the chain. Rather, the requested write operation is simply performed on the target file (process block 531). If it is determined that the requested write does more than merely extend the target file, another determination is made whether the target file includes, within the range of the write, references (e.g., overlay extents) corresponding to data blocks within a predecessor file (process block 527). If such references are discovered, data from the referenced data blocks is copied to the successor file as appropriate from the nearest predecessor file(s) (process block 528) and data blocks corresponding to the references are allocated within the target file (process block 529). Thereafter, or if no such references are discovered within the target file, data block data, if any, is copied from the target file to the successor file as appropriate (process block 530). The requested write operation may then be performed on the target file (process block 531) as shown.

Figure 5D:
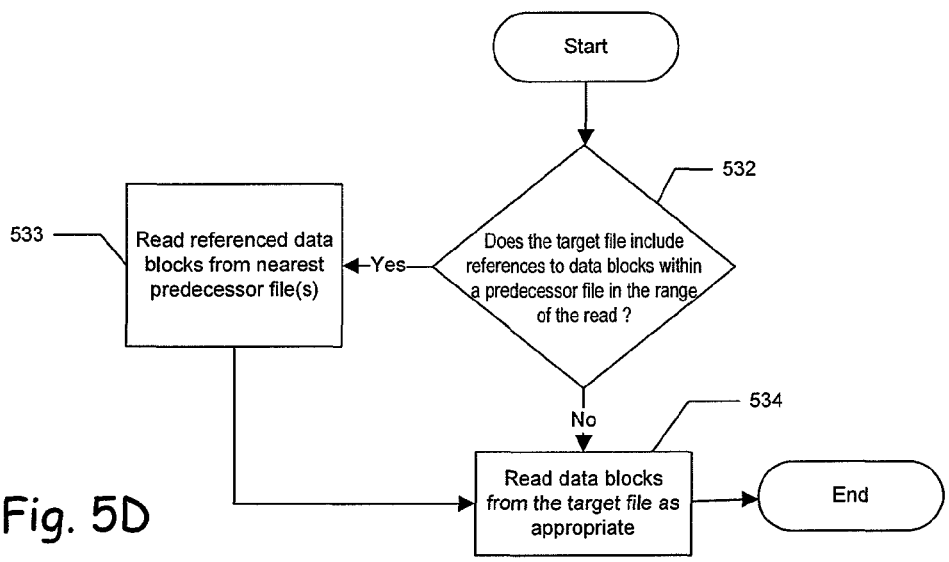
FIG. 5d illustrates a process for retrieving data stored within a fileset including a source file and a number of replica files formed using a chain structure according to an embodiment of the present invention.

FIG. 5d illustrates a process for retrieving data stored within a fileset including a source file and a number of replica files formed using a chain structure according to an embodiment of the present invention. In the illustrated embodiment, a determination is first made whether or not the target file includes within the range of a read operation, references to data blocks within a predecessor file (process block 532). If so, data block data corresponding to the referenced data is read from the nearest predecessor file(s) (process block 533). Thereafter or if a determination is made that no such references exist, data block data is read from the target file as appropriate (process block 534) as shown.

FIGS. 6a-6d illustrate a fileset including a source file and a number of replica files arranged within a tree structure according to an embodiment of the present invention. Initially, fileset 400 includes a source file 402 and a number of replica file copies of the source file (e.g., replica files 406, 410, 414 and 418) arranged in a chain structure as depicted previously in FIG. 4a. In an alternative embodiment, source file 402 and replica files 406, 410, 414, and 414 of fileset 400 are initially arranged in a tree structure in which each replica file depends or "branches" from source file 402. The particular initial designation or graphical relationship between replica files (e.g., whether replica file 414 is a copy of source file 402 or of replica file 410) should not however be construed as limiting to the invention embodiments described herein.

Source file 402 of the described embodiment includes a number of associated data blocks 403a-403e which are referenced directly or indirectly by replica files 406, 410, 414 and 418. In the illustrated embodiment, each replica file includes a file index (e.g., one or more i-nodes) with a pointer or reference to the "parent" or "root" file of the tree from which that replica file immediately depends. In the fileset embodiment illustrated by FIG. 6a, a write operation to a portion of replica file 406 has been depicted with the associated result to the dependency chain structure shown.

More specifically, replica file 406 is removed from the described initial chain of replica files such that replica file 410 depends directly from source file 402 (e.g., using a single overlay extent) and a block 407c, used to store data associated with the described write operation, is allocated within replica file 406 along with extents 408a and 408b to link portions of replica file 406 not associated with independent allocated blocks with preceding source file 402.

Figure 6A:
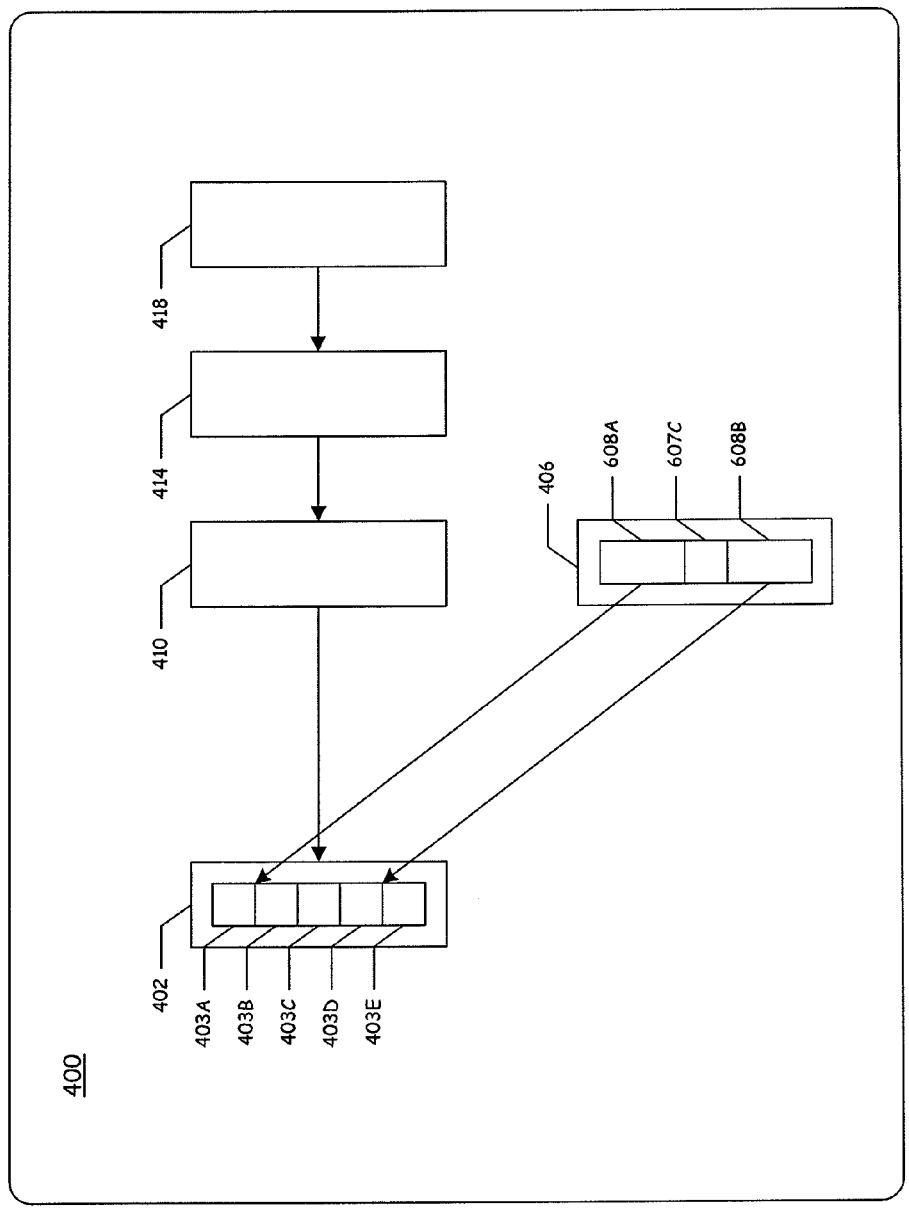
FIGS. 6a-6d illustrate a fileset including a source file and a number of replica files arranged within a tree structure according to an embodiment of the present invention.
Figure 6B:
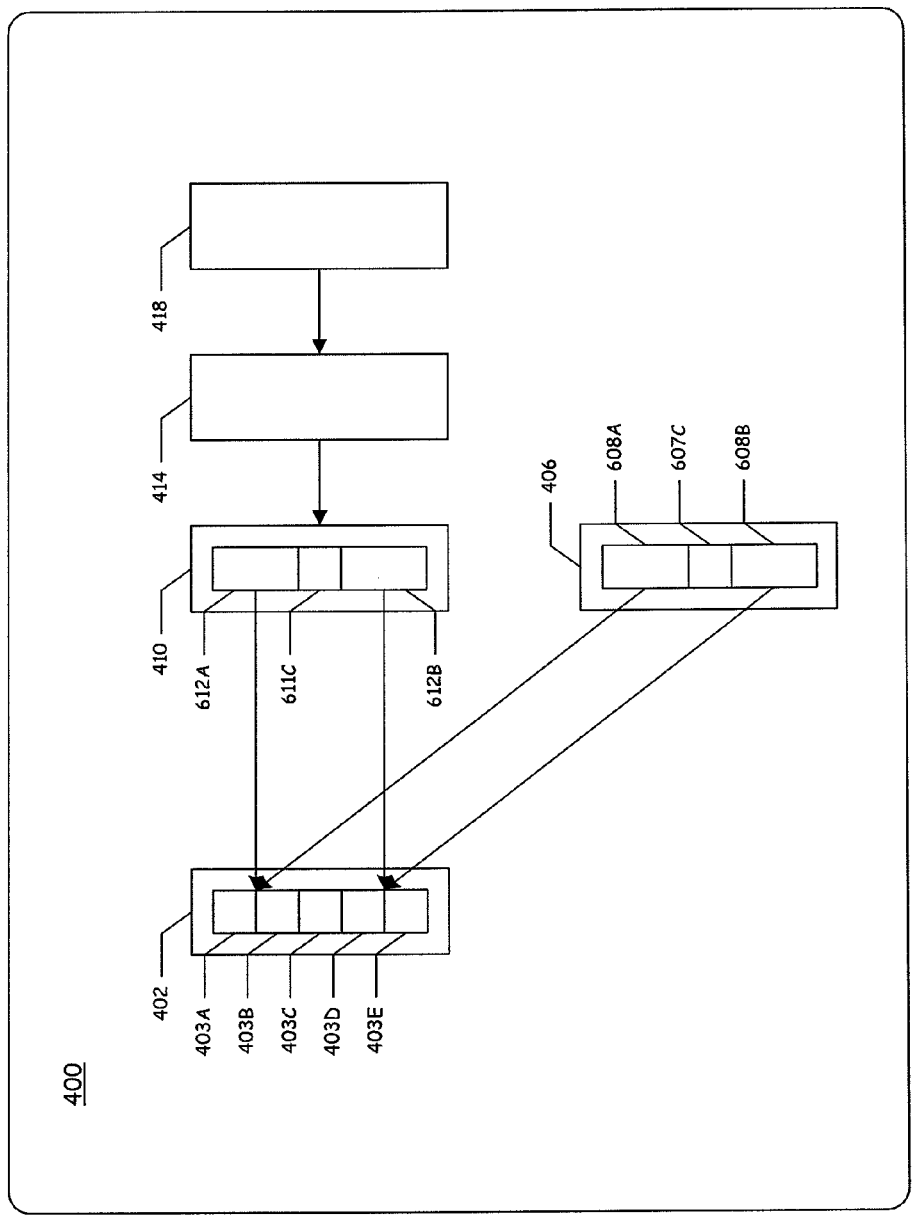

In the fileset embodiment illustrated by FIG. 6b, a write operation to a portion of source file 402 has been depicted with the associated changes to the dependency tree structure shown. More specifically, a block 611c is allocated within replica file 410 and used to store original data pushed/pulled from block 403c of source file 402. Consequently, extents 612a and 612b are created to link portions of replica file 410 not associated with independent allocated block 611c and therefore dependent on preceding source file 402 with corresponding portions of that source file. The write operation may then be performed to allocated block 403c with no additional changes to the dependency or allocated blocks of replica files 406, 414 or 418.

Figure 6C:
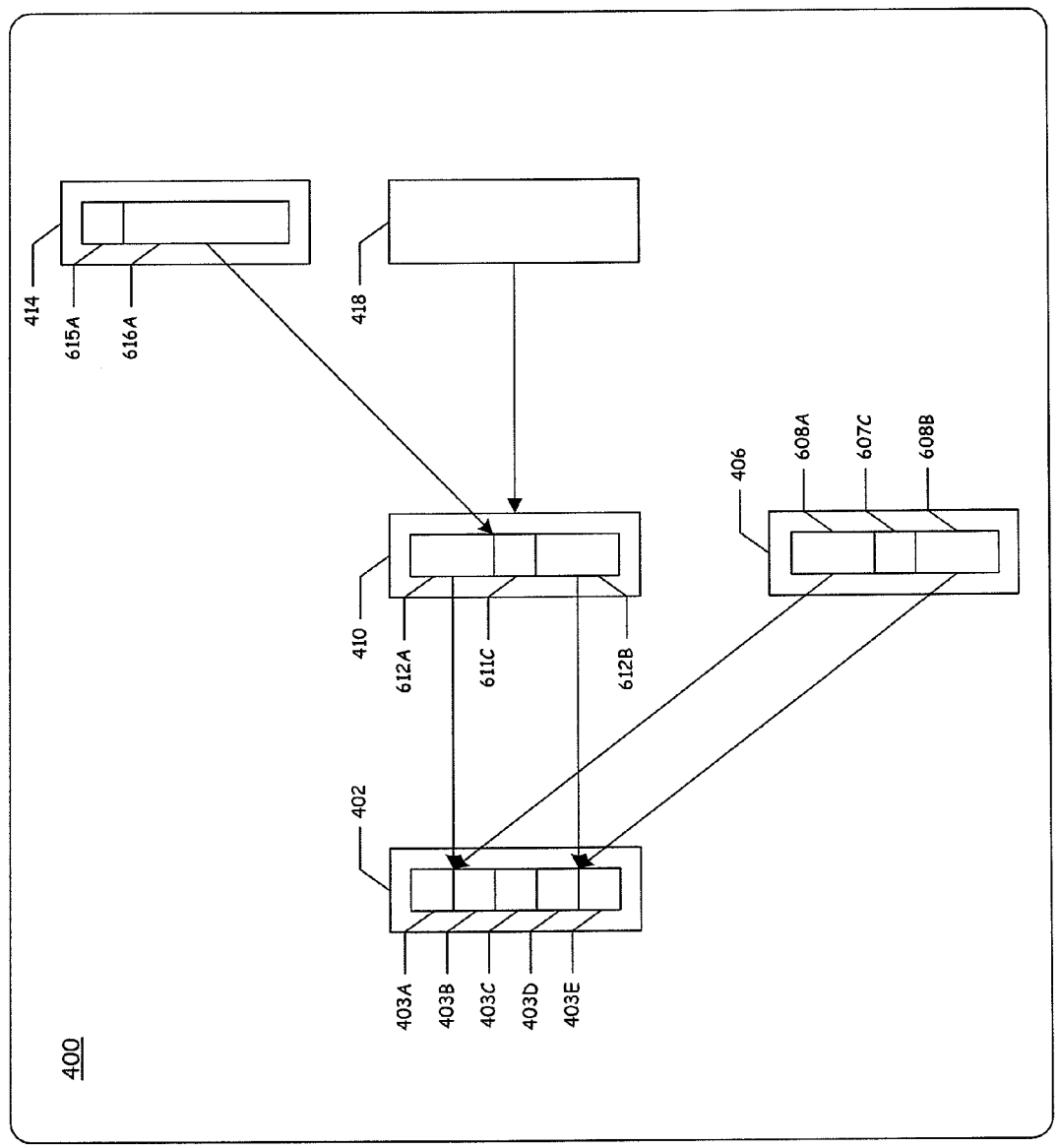

In the fileset embodiment illustrated by FIG. 6c, a write operation to a portion of replica file 414 has been depicted with the associated changes to the dependency tree structure shown. More specifically, replica file 414 is removed from the described initial chain of replica files such that replica file 418 depends directly from replica file 410 (e.g., using a single overlay extent) and a block 615a, used to store data associated with the described write operation, is allocated within replica file 414 along with an extent 616*a* to link the remainder of replica file 414 not associated with independent allocated blocks with preceding replica file 410.

Figure 6D:
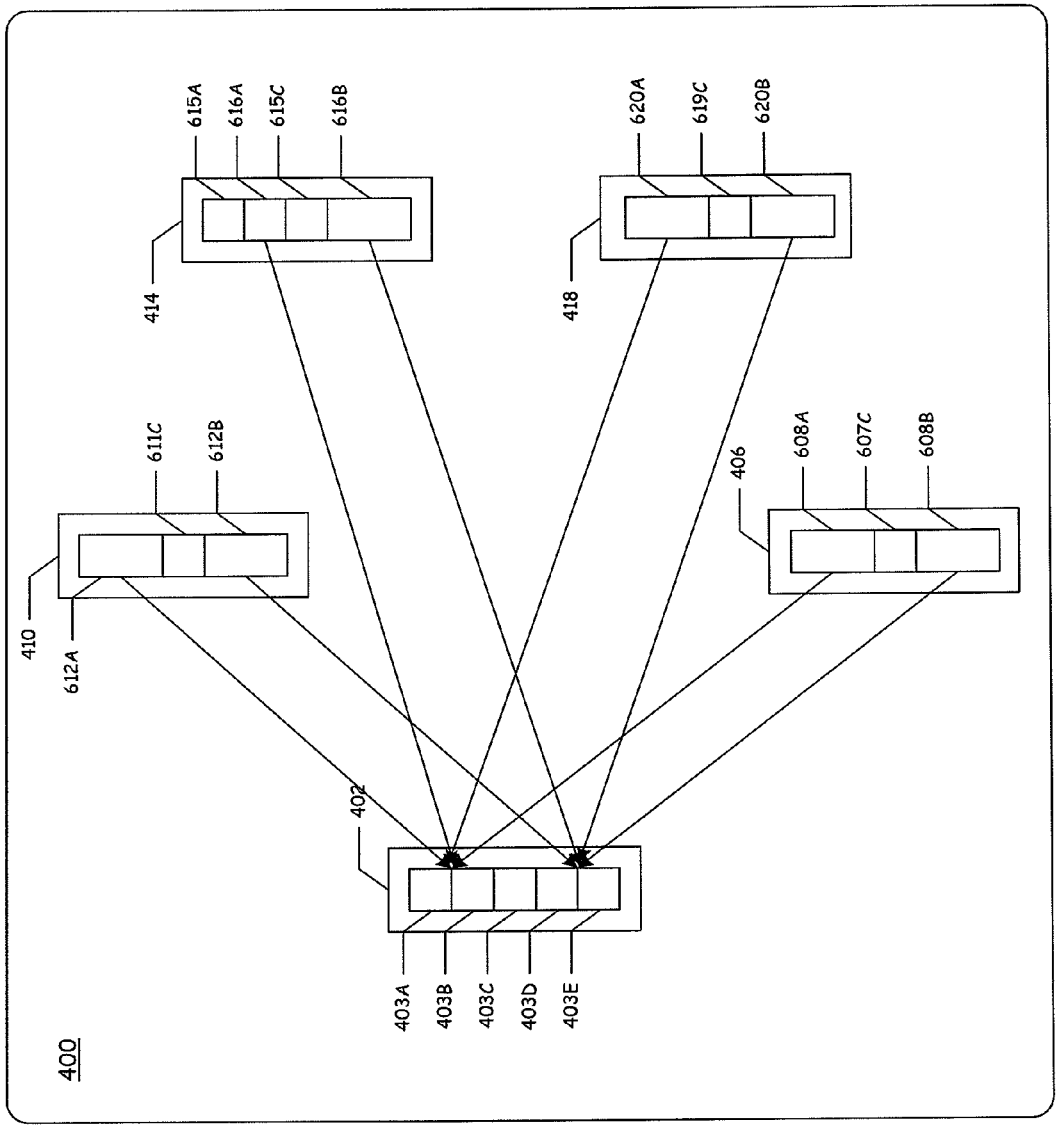

In the fileset embodiment illustrated by FIG. 6*d*, a write operation to a portion of replica file 410 has been depicted with the associated changes to the dependency tree structure shown. More specifically, replica file 410 is removed from the described initial chain of replica files such that the replica file chain is abolished and replica files 414 and 418 depend directly from source file 402 (e.g., using a single overlay extent) as shown. Moreover, data blocks 615*c* and 619*c* are allocated within replica files 414 and 418, respectively, to store copies of the data previously stored within data block 611*c* as a result of this dependency change causing the creation or modification of extents 616*a*, 616*b*, 620*a*, and 620*b* as shown. Following the abolition of the replica file chain, write operations to any new portion of source file 402 will cause the displaced original data of the source file to be copied to each of the replica files following any necessary data block allocations before such write operations can complete.

Figure 7A:
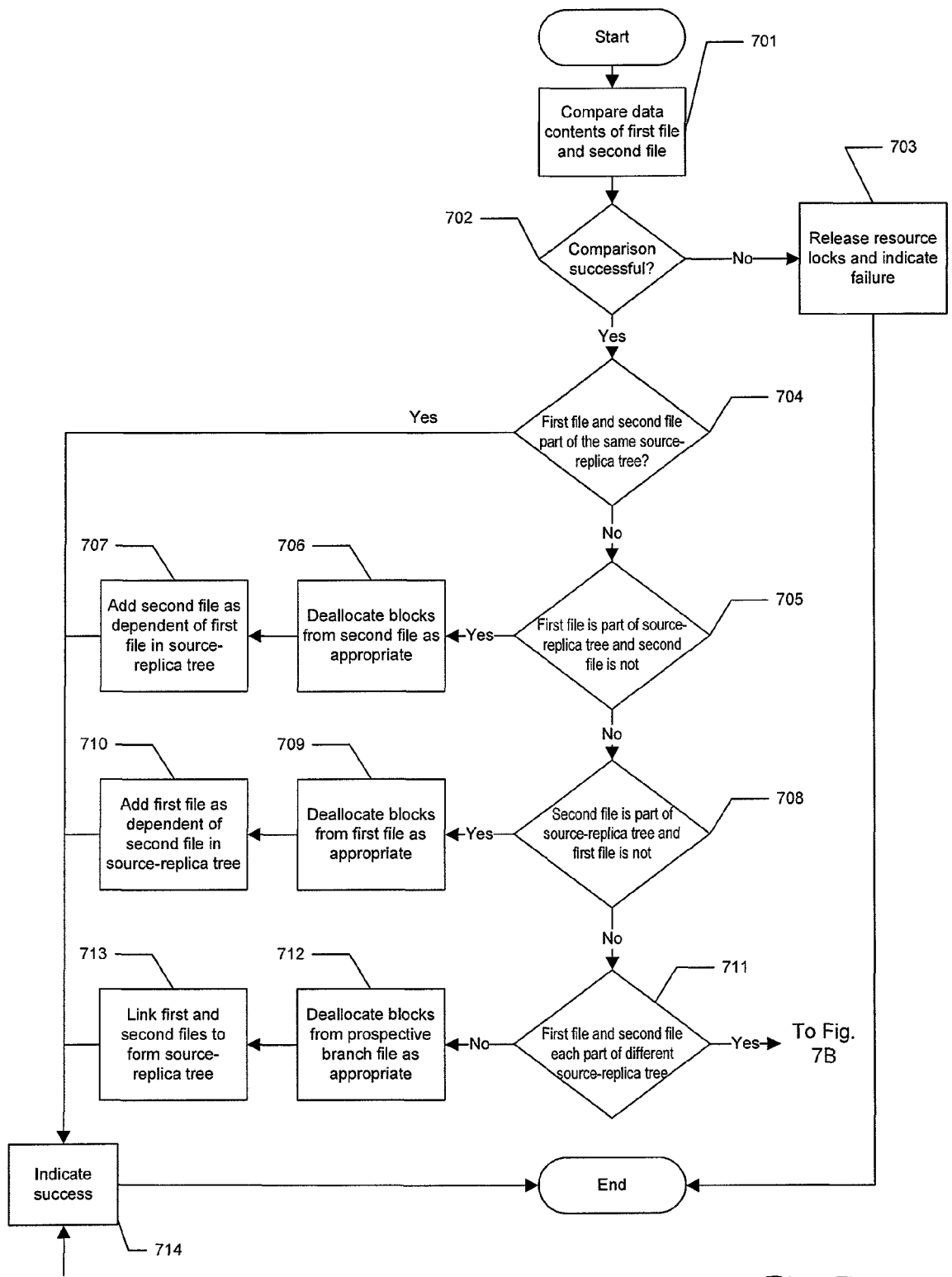
FIG. 7a illustrates a first portion of a process for forming one or more replica files of a source file using a tree structure according to an embodiment of the present invention.

FIG. 7*a* illustrates a first portion of a process for forming one or more replica files of a source file using a tree structure according to an embodiment of the present invention. In the illustrated process, a comparison of the data contents of a first file and a second file is first performed (process block 701) to determine whether the first and second files are copies of one another. A determination is then made whether or not the comparison completed successfully (e.g., if the comparison was actually performed and the first file and second file were determined to be copies of one another) (process block 702). If the comparison failed to complete successfully, any resource locks associated with the files are released and a source-replica relation failure is indicated (process block 703) as shown.

If the comparison was determined to be successful however, another determination is made whether the first and second files are already actually part of the same source-replica tree (process block 704). If so, an indication is made that the source-replica relationship was successfully established (process block 714). If it is determined that the first and second files are not already part of the same source-replica tree, a determination is next made whether the first file is part of a source-replica tree while the second file is not (process block 705). If so, data blocks are deallocated from the second file as appropriate (process block 706) and the second file is added as a dependent of the first file in its source-replica tree (process block 707) before success of the operation is indicated (process block 714). If it is not determined that the first file is part of a source-replica tree while the second file is not, a determination is made whether the second file is part of a source-replica tree while the first file is not (process block 708). If so, data blocks are deallocated from the first file as appropriate (process block 709) and the first file is added as a dependent of the second file in its source-replica tree (process block 710) before success of the operation is indicated (process block 714).

Figure 7B:
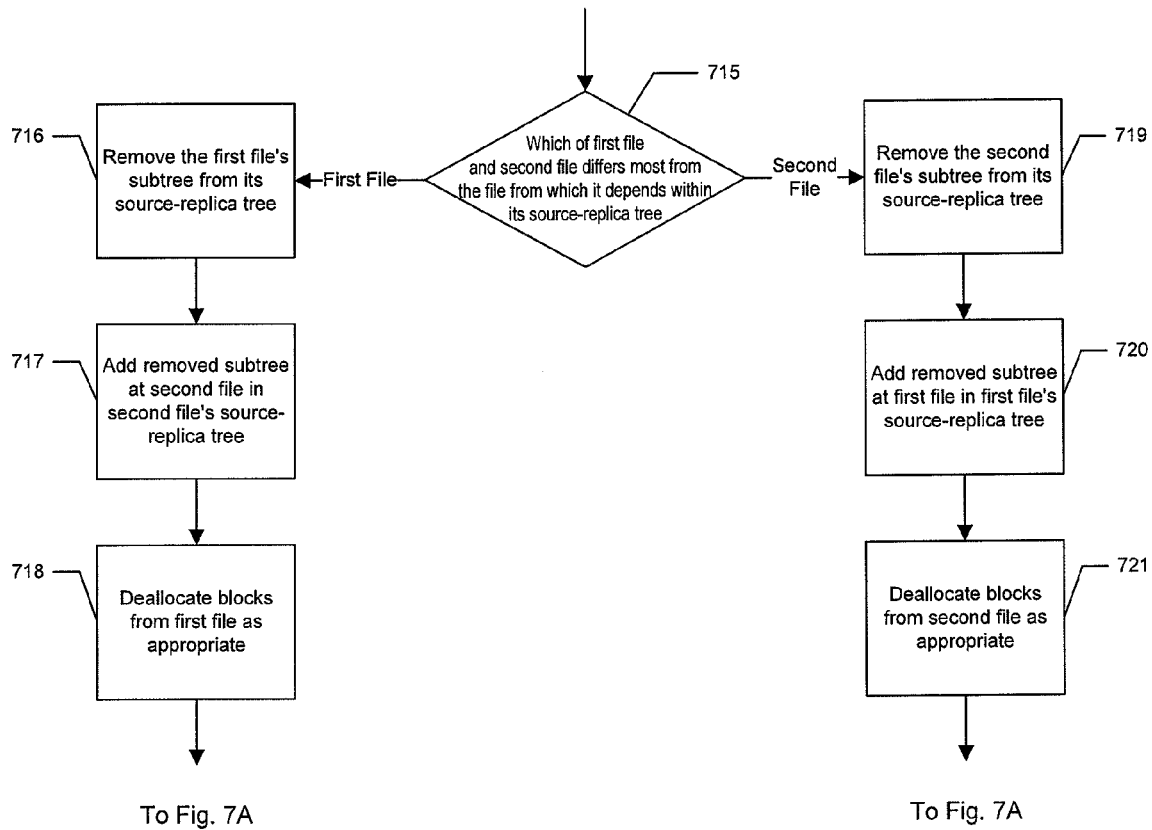
FIG. 7b illustrates a second portion of a process for forming one or more replica files of a source file using a tree structure according to an embodiment of the present invention.

Subsequently, a determination is made whether the first and second files are each part of separate source-replica trees (process block 711). If so, a sub-process illustrated by FIG. 7*b* is performed which indicates success upon return as shown, otherwise a prospective branch file is selected from the first file and the second file and data blocks are deallocated from the prospective branch file as appropriate (process block 712). According to one embodiment of the present invention, the selection of the prospective successor file is arbitrary or random. Thereafter the first file and the second file are appropriately linked to form a source-replica tree (process block 713) as shown (e.g., the prospective branch or "child" file is made dependent of the other file in its source-replica tree). Success is then indicated and the illustrated process terminates as shown.

FIG. 7*b* illustrates a second portion of a process for forming one or more replica files of a source file using a tree structure according to an embodiment of the present invention. Entering the depicted process from the process illustrated by FIG. 7*a*, a determination is first made which of the first and second file differs most from the file from which it depends within their respective source-replica tree (process block 715). If the first file exhibits the greatest difference, the subtree having the first file as its root is identified and removed (process block 716). Next, the removed subtree is added at the second file within the second file's source-replica tree (process block 717). Once this has been accomplished, blocks are deallocated from the first file as appropriate (process block 718). Thereafter, the process illustrated by FIG. 7*a* is re-entered as previously described herein. If a determination is made that the second file differs the most from the file from which it depends within its respective source-replica tree the process elements (process blocks 716-718) as previously described with respect to the first file are performed substituting the first and second files (process blocks 719-721).

Figure 7C:
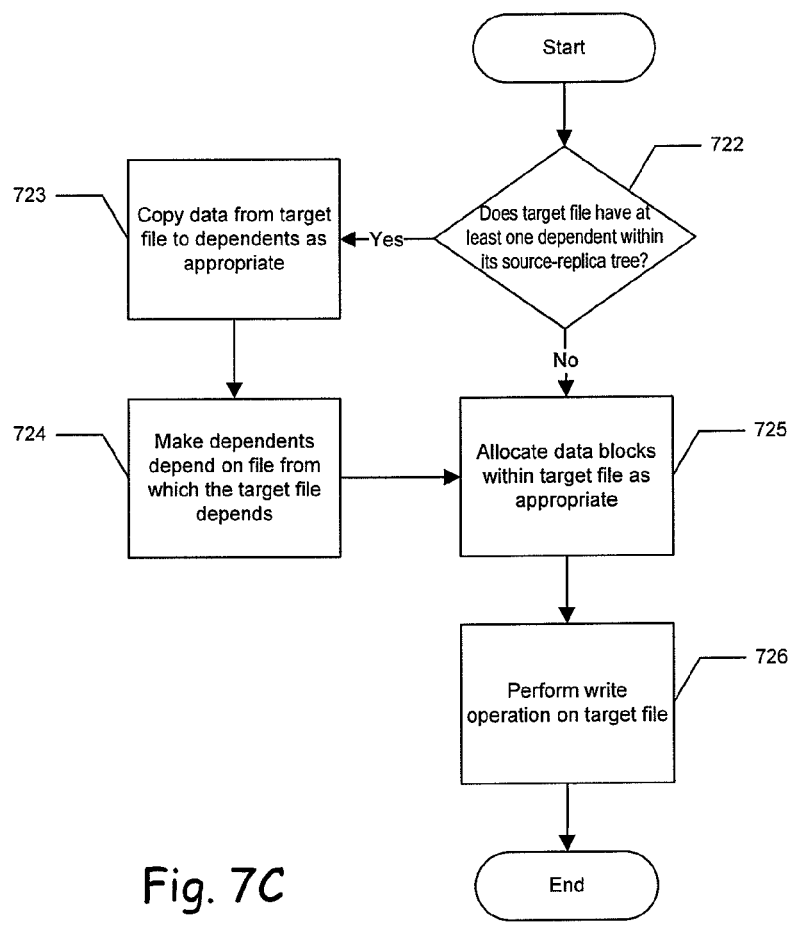
FIG. 7c illustrates a process for maintaining data coherency within a fileset including a source file and a number of replica files formed using a tree structure according to an embodiment of the present invention.

FIG. 7*c* illustrates a process for maintaining data coherency within a fileset including a source file and a number of replica files formed using a tree structure according to an embodiment of the present invention. In the illustrated process, a determination is first made whether or not the target file of the write operation has at least one dependent file within its source-replica tree (process block 722). If no dependent files are discovered within the target file's source-replica tree, data blocks are allocated within the target file as appropriate (process block 725) and the writer operation is then performed on the target file (process block 726). If at least one dependent file is located however, data is copied from the target file to its dependents (e.g., to the first or "root" dependent file in each subtree branching off of the target file) as appropriate (process block 723). Thereafter, the dependency of the files is changes such that any files depending from the target file (i.e., children of the target file) are made to depend from the file from which the target file depends (i.e., the parent of the target file) (process block 724) before data blocks are allocated within the target file as previously discussed (process block 725).

Figure 7D:
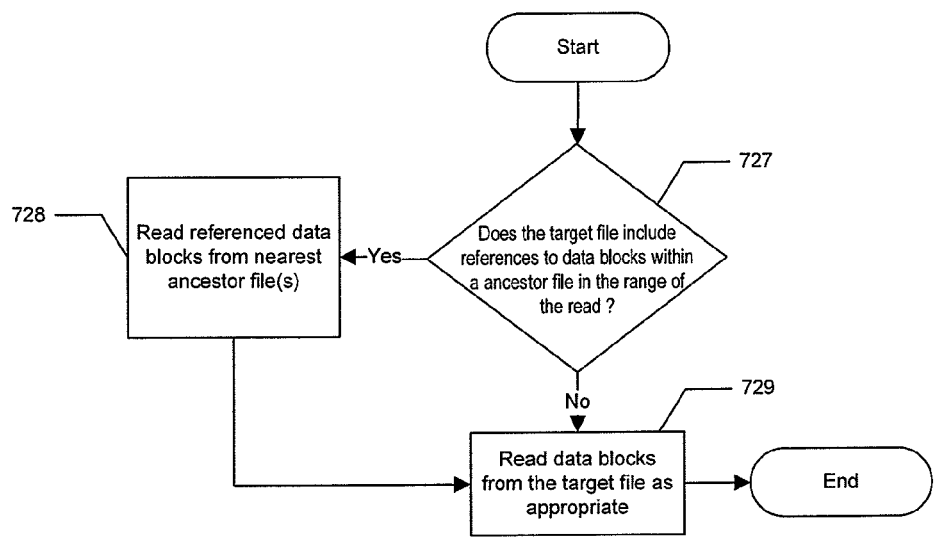
FIG. 7d illustrates a process for retrieving data stored within a fileset including a source file and a number of replica files formed using a tree structure according to an embodiment of the present invention.

FIG. 7*d* illustrates a process for retrieving data stored within a fileset including a source file and a number of replica files formed using a tree structure according to an embodiment of the present invention. In the illustrated embodiment, a determination is first made whether or not the target file includes within the range of a read operation, references to data blocks within an ancestor (e.g., parent, grandparent, etc.) file (process block 727. If so, data block data corresponding to the referenced data is read from the nearest ancestor file(s) (process block 728). Thereafter, or if a determination is made that no such references exist, data block data is read from the target file as appropriate (process block 729) as shown.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional data processing system or computer systems; however, those skilled in the art will appreciate that the present invention is capable of being distributed as a program product in a variety of forms, and that the present invention applies equally regardless of the particular type of signal bearing media used to actually carry out the distribution. Examples of such signal bearing media include recordable media such as floppy disks and CD-ROM, transmission type media such as digital and analog communications links, as well as media storage and distribution systems developed in the future.

The above-discussed embodiments may be implemented using software modules which perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method, implemented using a computer system, comprising:
    associating a source file and a replica file with one another, using a processor of said computer system, wherein
    said replica file and said source file are both within a first fileset,
    said replica file is not within a fileset that is a clone of a fileset comprising said source file,
    a file system comprises said first fileset,
    said file system is stored in at least one storage device of said computer system,
    said source file comprises
        a first reference to a first data block, and
        a metadata file system object,
    said replica file comprises
        a replica metadata file system object, and
    said associating comprises
        generating a second reference to said first data block by
            generating a reference within said replica metadata file system object, wherein
        said reference is to said metadata file system object, and
        modifying said replica file to comprise the second reference to said first data block;
    receiving a modification request at the computer system, wherein said modification request is a request to modify data within one of said source file and said replica file; and
    in response to said receiving said modification request, allocating a block within said one of said source file and said replica file, using the processor.

2. The computer-implemented method of claim 1, further comprising:
    in response to said associating,
    in response to receiving a request to modify data within said source file, allocating a block within said replica file,
    copying said data within said source file to said block within said replica file, and
    modifying said data within said source file.

3. The computer-implemented method of claim 1, further comprising:
    in response to said associating,
    in response to receiving a request to modify data within said replica file, allocating a block within said replica file, and
    modifying said data within said block within said replica file.

4. The computer-implemented method of claim 1, wherein said associating comprises:
    associating said source file and said replica file using a chain data structure within said first fileset.

5. The computer-implemented method of claim 1, wherein said associating comprises:
    associating said source file and said replica file using a tree data structure within said first fileset.

6. The method of claim 1, further comprising:
    accessing a first storage device, wherein
        said first storage device stores a first set of data;
    accessing a second storage device, wherein
        a storage system comprises said first and second storage devices,
        said file system is stored in at least one of said storage devices, and
        said second storage device stores a second set of data;
    comparing, using said first set of data and said second set of data, said source file and said replica file;
    determining whether said source file and said replica file are part of the same source-replica structure of linked files; and
    determining whether said source file should be associated with said replica file in response to both said comparing and said determining whether said source file and said replica file are part of the same source-replica structure of linked files.

7. The method of claim 1, wherein
said replica file comprises a reference to said source file.

8. The method of claim 6, wherein
said first storage device and said second storage device are the same storage device.

9. The method of claim 1, wherein said replica file and said source file are stored within a single directory structure.

10. A system comprising:
a processor;
a storage unit, wherein
said storage unit is configured to store a first fileset,
a file system comprises said first fileset,
said first fileset comprises
  a source file, and
  a replica file,
said replica file is not within a fileset that is a clone of a fileset comprising said source file,
said source file comprises
  a reference to a first data block, and
  a metadata file system object, and
said replica file comprises a replica metadata file system object; and
a file system module, wherein
said file system module comprises a file system submodule,
said file system module is configured to associate said source file and said replica file by virtue of being configured to
generate a second reference to said first data block by virtue of being configured to generate a reference within said replica metadata file system object, wherein
said reference is to said metadata file system object, and
modify said replica file to comprise a second reference to said first data block,
said file system submodule is configured to
receive a modification request at the computer system, and
allocate a block within a one of said source file and said replica file, in response to the modification request, and
said modification request is a request to modify data within said one of said source file and said replica file.

11. The system of claim 10, wherein
said modification request is a request to modify data within said source file, and said file system submodule is further configured to, in response to said modification request,
copy said data within said source file to said block within said replica file, and
modify said data within said source file.

12. The system of claim 10, wherein
said modification request is a request to modify data within said replica file, and
said file system submodule is further configured to, in response to said modification request,
modify said data within said block within said replica file.

13. The system of claim 11, wherein
said file system submodule is further configured to associate said source file and
said replica file using a chain data structure within said first fileset.

14. The system of claim 11, wherein
said file system submodule is further configured to associate said source file and
said replica file using a tree data structure within said first fileset.

15. A computer program product comprising:
a computer-readable storage medium, wherein said computer program product is encoded in said computer-readable storage medium;
a first set of instructions, executable on a computer system, configured to associate a source file and a replica file with one another, wherein
said replica file and said source file are both within a first fileset,
said replica file is not within a fileset that is a clone of a fileset comprising said source file,
a file system comprises said first fileset,
said source file comprises a first reference to a first data block, and
said associating comprises
modifying said replica file to comprise a second reference to said first data block;
a second set of instructions, executable on said computer system, configured to generate said second reference by generating a reference within a replica metadata file system object to a metadata file system object, wherein
said source file comprises said metadata file system object, and
said replica file comprises said replica metadata file system object;
a third set of instructions, executable on said computer system, configured to receive a modification request, wherein
said modification request is a request to modify data within one of said source file and said replica file; and
a fourth set of instructions, executable on said computer system, configured to allocate a block within said one of said source file and said replica file, wherein
said fourth set of instructions is executed in response to said execution of said first set of instructions and in response to said modification request.

16. The computer program product of claim 15, further comprising:
a fifth set of instructions, executable on said computer system, configured to copy said data within said source file to said block within said replica file; and
a sixth set of instructions, executable on said computer system, configured to modify said data within said source file, wherein
said fifth set and said sixth set of instructions are executed in response to said execution of said first set of instructions and said modification request, and
said modification request is a request to modify data within said source file.

17. The computer program product of claim 15, further comprising:
a fifth set of instructions, executable on said computer system, configured to modify said data within said replica file, wherein
said fifth set of instructions is executed in response to the execution of said first set of instructions and said modification request, and
said modification request is a request to modify data within said replica file.

18. The computer program product of claim 16, further comprising:
a seventh set of instructions, executable on said computer system, configured to associate said source file and said replica file using a chain data structure within said fileset.

19. The computer program product of claim 16, further comprising:
a seventh set of instructions, executable on said computer system, configured to associate said source file and said replica file using a tree data structure within said fileset.

* * * * *